United States Patent
Cho et al.

(10) Patent No.: US 9,174,345 B2
(45) Date of Patent: Nov. 3, 2015

(54) ROBOT ARM INCLUDING FORCE SENSING APPARATUS

(75) Inventors: Hyun-do Cho, Yongin-si (KR); Yeon-ho Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 2 days.

(21) Appl. No.: 13/471,070

(22) Filed: May 14, 2012

(65) Prior Publication Data

US 2013/0110289 A1    May 2, 2013

(30) Foreign Application Priority Data

Nov. 1, 2011    (KR) .................. 10-2011-0112876

(51) Int. Cl.
| | |
|---|---|
| *G06F 19/00* | (2011.01) |
| *B25J 18/00* | (2006.01) |
| *B25J 19/00* | (2006.01) |
| *B25J 13/08* | (2006.01) |
| *A61B 19/00* | (2006.01) |

(52) U.S. Cl.
CPC .......... *B25J 13/085* (2013.01); *Y10T 74/20323* (2015.01)

(58) Field of Classification Search
CPC ............... A61B 19/22; A61B 19/2203; A61B 2017/2934; A61B 2017/2939; A61B 2019/464; A61B 2019/2242; B25J 13/082; B25J 13/085; B25J 15/0206; Y10T 74/20323
USPC .................. 606/1, 130; 700/258; 74/490.04; 414/751.1; 73/862.61, 862.621, 73/862.624
See application file for complete search history.

(56) References Cited

U.S. PATENT DOCUMENTS

| | | |
|---|---|---|
| 5,807,377 A | 9/1998 | Madhani et al. |
| 6,902,560 B1 | 6/2005 | Morley et al. |
| 2007/0151391 A1 | 7/2007 | Larkin et al. |
| 2008/0009750 A1 * | 1/2008 | Aeby et al. .................. 600/478 |
| 2008/0147090 A1 | 6/2008 | Seibold et al. |
| 2008/0276746 A1 | 11/2008 | Seibold |
| 2009/0177095 A1 * | 7/2009 | Aeby et al. .................. 600/478 |
| 2009/0192522 A1 | 7/2009 | Blumenkranz |
| 2009/0248038 A1 | 10/2009 | Blumenkranz et al. |
| 2010/0169815 A1 | 7/2010 | Zhao et al. |
| 2010/0207412 A1 * | 8/2010 | Okazaki et al. ............... 294/106 |

(Continued)

FOREIGN PATENT DOCUMENTS

| | | |
|---|---|---|
| EP | 2 127 604 A1 | 12/2009 |
| JP | 11347979 A * | 12/1999 |
| JP | 2005-103056 | 4/2005 |

(Continued)

*Primary Examiner* — Gary Jackson
*Assistant Examiner* — Boniface N Nganga
(74) *Attorney, Agent, or Firm* — Harness, Dickey & Pierce, P.L.C.

(57) ABSTRACT

A robot arm including a force sensing apparatus capable of accurately sensing of a force in the axial direction of the robot arm during operation thereof, without being affected by a motion of the robot arm. The robot arm includes: a body that is elastically deformable and has a pipe form extending in an axial direction; an instrument connected to an operational end of the body; a cable that is connected to a terminal end of the instrument and controls an operation of the instrument; and a force sensing apparatus that is attached to a surface of the body and senses a force acting upon the body, wherein the cable at the terminal end of the instrument is configured to move along a direction perpendicular to the axial direction of the body.

25 Claims, 4 Drawing Sheets

(56) References Cited

U.S. PATENT DOCUMENTS

2010/0313679 A1 12/2010 Larkin et al.
2011/0251612 A1* 10/2011 Faller et al. ..................... 606/52

FOREIGN PATENT DOCUMENTS

KR 100778387 B1 1/2007
WO WO 2011145713 A1 * 11/2011

* cited by examiner

ROBOT ARM INCLUDING FORCE SENSING APPARATUS

CROSS-REFERENCE TO RELATED APPLICATIONS

This application claims the priority benefit of Korean Patent Application No. 10-2011-0112876, filed on Nov. 1, 2011, in the Korean Intellectual Property Office, the disclosure of which is incorporated herein in its entirety by reference.

BACKGROUND

1. Field

Example embodiments of the following disclosure relate to a robot arm, including a force sensing apparatus, and more particularly, to a robot arm including a force sensing apparatus capable of accurately sensing a force in an axial direction of the robot arm, without being affected by a motion of the robot arm.

2. Description of the Related Art

Robots for diverse uses have been developed and commercialized in line with the advances in robot technology. For example, a remote-controlled surgery robot connected to a surgical part of a patient assists a surgeon in easily conducting minute surgical operations by viewing the surgical part remotely on an endoscope screen. By using the surgery robot, handshake that is caused as the surgeon moves his/her hand may be compensated for, and a remote surgical arm may scale-down and reproduce the motion of the surgeon's hand, and thus, precise operations may be conducted.

However, currently commercialized surgery robots provide only image information about a surgical part via an endoscope, and touch information which can be obtained in typical surgical operations is not provided. That is, compared to a surgical operation actually performed by using the hands, it is difficult for a surgeon to accurately figure out the amount of force applied to a surgical part by a surgical instrument attached to a surgery robot arm. Thus, if information about intensity of a contact of the surgical instrument, attached to the surgery robot arm, to the surgical part is provided to the surgeon, the information about the contact together with the image information may be helpful for minute operations needed for cutting, cauterization, suture, and the like, of the surgical part. To this end, it is important to accurately measure forces acting between the surgical instrument attached to the surgery robot arm and the surgical part.

Accordingly, installment of a delicate force sensing apparatus at an operational end of a surgery robot has been researched. However, currently suggested force sensing apparatuses are not capable of accurately measuring forces in each direction or it is difficult to mount force sensing apparatuses on an arm portion of a surgery robot in a limited space. Additionally, such force sensing apparatuses may malfunction in an environment where a strong electromagnetic field exists. In particular, it is difficult to sense a force acting in an axial direction of a robot arm. In addition, while grippers installed at the operational end of the surgery robot or the like are operating, a reaction force may be generated in the axial direction of the robot arm, which makes it even more difficult to sense a force in the axial direction.

SUMMARY

Provided is a robot arm including a force sensing apparatus capable of accurately sensing a force in an axial direction of the robot arm without being affected by a motion of the robot arm.

Additional aspects will be set forth in part in the description which follows and, in part, will be apparent from the description, or may be learned by practice of the presented embodiments.

According to an aspect of the present disclosure, a robot arm includes: a body that is elastically deformable and has a pipe form extending in an axial direction; an instrument connected to an operational end of the body; a cable that is connected to a terminal end of the instrument and controls an operation of the instrument; and a force sensing apparatus that is attached to a surface of the body and senses a force action on the body, wherein the cable at the terminal end of the instrument is configured to move along a direction perpendicular to an axial direction of the body.

The cable may include a pair of cables configured to move at the terminal end of the instrument along the direction perpendicular to the axial direction of the body in opposite directions to each other.

The robot arm may further include a cover covering the body at the operational end of the body, wherein the instrument is pivotally installed to the cover.

The instrument may include a pair of grippers, and the cover may include a hinge that pivots the pair of grippers and a torsion spring that is coupled to the hinge so as to provide an elastic force to the pair of grippers in a direction in which the pair of grippers split apart.

The robot arm may further include: a base frame arranged in the body; and a direction conversion unit that is installed on the base frame and converts a direction of the cable which is parallel to the axial direction to a direction perpendicular to the axial direction.

The cable may include a pair of cables configured to move at the terminal end of the instrument along the direction perpendicular to the axial of the body in opposite directions to each other, wherein the instrument includes a pair of grippers respectively connected to the pair of cables, wherein the pair of grippers includes a first grippers and a second grippers, and the pair of cables includes a first cable and a second cable, and the direction conversion unit includes a first direction conversion unit and a second direction conversion unit, and the first cable is engaged with the first direction conversion unit to be coupled to a terminal end of the second grippers, and the second cable is engaged with the second direction conversion unit to be coupled to a terminal end of the first grippers, wherein the first direction conversion unit is disposed opposite to the terminal end of the second grippers with respect to a center of the body, and the second direction conversion unit is disposed opposite to the terminal end of the first grippers with respect to the center of the body.

The first cable may be arranged to move in a direction perpendicular to the axial direction of the body between the first direction conversion unit and the terminal end of the second grippers, and the second cable is arranged to move in the direction perpendicular to the axial of the body between the second direction conversion unit and the terminal end of the first grippers, and the first cable and the second cable are arranged to simultaneously move in opposite directions.

Each of the first and second direction conversion units may include at least one pulley.

Each of the first and second direction conversion units may include two pulleys, and the first and second cables may be wound around the two pulleys in opposite directions to each other.

The force sensing apparatus may include: at least one fiber Bragg gratings (FBGs) attached to the body; a light source providing light to each of the FBGs; and a light detector detecting light reflected by each of the FBGs or light that has passed through each of the FBGs.

In addition, the force sensing apparatus may include: at least three fiber Bragg gratings (FBGs) attached on the surface of the body; a light source providing light to each of the FBGs; and a light detector detecting light reflected by each of the FBGs or light that has passed through each of the FBGs.

The at least three FBGs may be arranged to extend in the axial direction of the body.

The at least three FBGs may be attached to the surface of the body at at least three different positions at predetermined intervals along an azimuth angle direction.

The force sensing apparatus may further include at least three openings that are formed in the body between each two adjacent FBGs.

When an operational end of the force sensing apparatus at which the instrument is installed is assumed to be an upper portion of the body, a center of the openings may be arranged at a position lower than a center of the FBGs between each two adjacent FBGs.

The force sensing apparatus may further include an adhesive to adhere the FBGs to the body, and the adhesive may be coated on the body so as to cover the FBGs overall.

The body may include: an upper portion and a lower portion separated from each other; at least three elastic beams that connect the upper portion and the lower portion of the body and extend in a direction perpendicular to an axial direction of the body; and a plurality of gaps respectively formed between each of the elastic beams and the upper portion of the body and between each of the elastic beams and the lower portion of the body.

A first end portion of each of the elastic beams may be connected to the upper portion of the body, and a second end portion of each of the elastic beams disposed opposite the first end portion may be connected to the lower portion of the body.

The body may further include at least three stoppers respectively formed in spaces between each two adjacent elastic beams.

The stopper may include: a first protrusion that protrudes and extends from the lower portion of the body toward the upper portion of the body in the axial direction of the body; and a second protrusion that protrudes and extends from the upper portion of the body toward the lower portion of the body in the axis direction of the body to surround the first protrusion.

The first protrusion may include an intermediate portion having a relatively small width and an end portion having a relatively large width, and the second protrusion may include an intermediate portion having a relatively small width and an end portion having a relatively large width, wherein the first protrusion and the second protrusion are engaged with each other in a complementary form.

The FBGs may be attached to the body across the stoppers.

The FBGs may be attached to the body across the elastic beam.

The robot arm may further include an adhesive to attach the FBGs to the body, wherein the adhesive is coated on the body to correspond only to two end portions of the FBGs.

According to an aspect of the present disclosure, a system includes a robot arm, including a force sensing apparatus; and an instrument connected to the robot arm; wherein the robot arm comprises: a body that is elastically deformable and extends in an axial direction; and a cable that is connected to the instrument and controls an operation of the instrument, wherein the force sensing apparatus is attached to the body and senses a force exerted upon the body.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
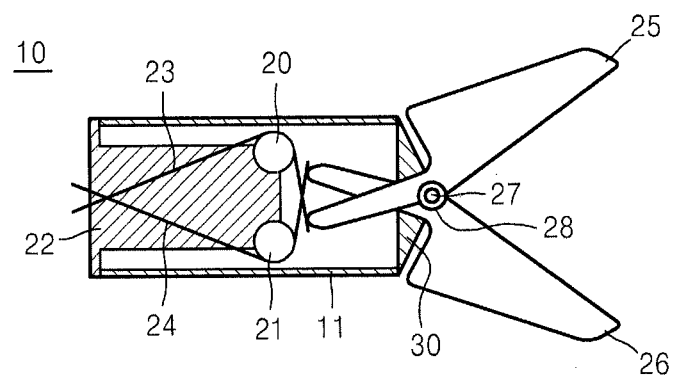
FIG. 1 is a conceptual diagram illustrating an operational principle of a robot arm, according to an example embodiment.

Reference will now be made in detail to embodiments, examples of which are illustrated in the accompanying drawings, wherein like reference numerals refer to the like elements throughout and sizes of elements may be exaggerated for clarity and convenience of description. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a conceptual diagram illustrating an operational principle of a robot arm 10, according to an example embodiment. Referring to FIG. 1, the robot arm 10 includes a body 11 which has a pipe form and extends in an axial direction, a pair of grippers 25 and 26 that are pivotally installed at an operational end of the body 11, and a pair of cables 23 and 24 respectively connected to terminal ends of the grippers 25 and 26 to control operations of the grippers 25 and 26. In addition, a cover 30, covering the body 11, may be further disposed at the operational end of the body 11. Thus, the grippers 25 and 26 may be pivotally installed on the cover 30 via a hinge 27. Although FIG. 1 exemplarily shows that the grippers 25 and 26 are installed at the operational end of the body 11, other various instruments may also be connected to the operational end of the body 11. For example, a surgical knife, scissors, a suction device, a compact camera, a cautery device, or the like, may be pivotally connected to the operational end of the body 11. Thus, the grippers 25 and 26 are just an example presented for convenience of description, and the current embodiment is not limited thereto. In addition, although not illustrated in FIG. 1, a force sensing apparatus, which is to be described later may be installed at the body 11.

A torsion spring 28 which is coupled to the grippers 25 and 26 may be installed at the hinge 27. Since the torsion spring 28 provides an elastic force in a direction in which the grippers 25 and 26 split apart, one pair of the grippers 25 and 26 may be in a normally opened state. Accordingly, by pulling one pair of cables 23 and 24, the grippers 25 and 26 are closed to grip an object, such as, a surgical instrument, and by releasing the cables 23 and 24, the grippers 25 and 26 are opened again.

According to the current embodiment, in order to obtain a large grip force by pulling the cables 23 and 24 even with a small force, it is preferable that a distance between a pivotal axis of the grippers 25 and 26 and a point of action of the cables 23 and 24 is longer. That is, it may be preferable if a connection part between the cables 23 and 24 and the grippers 25 and 26 is farther from the hinge 27. In addition, when the cables 23 and 24 pull the grippers 25 and 26, a tension generated between the cables 23 and 24 and the grippers 25 and 26 acts on the body 11 and the body 11 may be deformed. In this case, the deformation of the body 11 may affect a sensing result of a force sensing apparatus that senses an external force acting on the body 11. In particular, if a tension acts in an axial direction of the body 11, a large distortion may be caused when sensing an external force that acts in the axial direction of the body 11.

According to the current embodiment, the cables 23 and 24 and the grippers 25 and 26 of the robot arm 10 are designed in consideration of the above-described details. For example, a base frame 22 is disposed in the body 11, and direction conversion units 20 and 21 that convert movement directions of the cables 23 and 24 from parallel to the axial direction into perpendicular to the axial direction are arranged on the base frame 22. The cables 23 and 24 are engaged with the direction conversion units 20 and 21, and are respectively coupled to the terminal ends of the corresponding grippers 25 and 26. For example, after being engaged with the first direction conversion unit 20, the first cable 23 is coupled to the terminal end of the second grippers 26; also, after being engaged with the second direction conversion unit 21, the second cable 24 is coupled to the terminal end of the first grippers 25. The first cable 23 and the first direction conversion unit 20 may be arranged opposite to the terminal end of the second grippers 26 with respect to a center of the body 11. Further, the second cable 24 and the second direction conversion unit 21 may be arranged opposite to the terminal end of the first grippers 25 with respect to the center of the body 11. Accordingly, a connection portion between the first and second cables 23 and 24 and the first and second grippers 25 and 26 may be distanced apart from the hinge 27 as far as possible.

In addition, the first and second cables 23 and 24 may move between the direction conversion units 20 and 21 and the first and second grippers 25 and 26 in a direction perpendicular to the axial direction of the body 11. Accordingly, as the robot arm 10 operates, tension of the cables 23 and 24 works only in a direction perpendicular to the axial direction of the body 11, and does not work in the axial direction. Accordingly, distortion is not generated in results of force sensing in the axial direction when the force sensing apparatus, which is to be described later senses a force acting on the body 11. Moreover, since the first and second cables 23 and 24 move in opposite directions to each other at the same time between the direction conversion units 20 and 21 and the terminal ends of the first and second grippers 25 and 26, tensions of the first and second cables 23 and 24 working in the direction perpendicular to the axis of the body 11 may offset each other. Accordingly, the tensions of the first and second cables 23 and 24 hardly work in the axial direction or in the direction perpendicular to the axial direction during an operation of the robot arm 10, and thus, a force acting on the body 11 may be accurately sensed.

Figure 2:
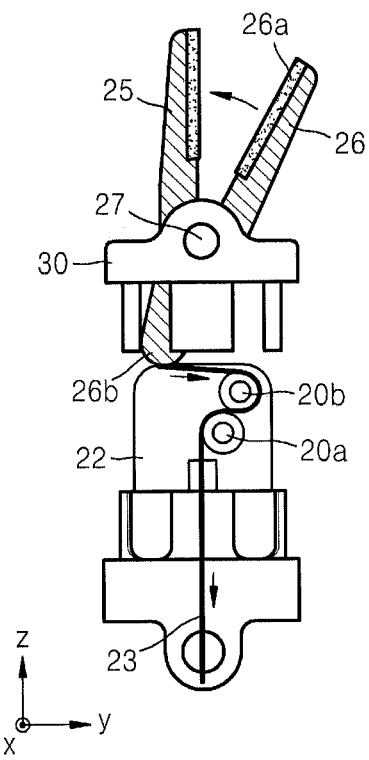
FIG. 2 is a schematic view illustrating a configuration and operation of direction conversion units illustrated in FIG. 1.

The direction conversion units 20 and 21 may be each formed by at least one pulley. FIG. 2 is a schematic view illustrating a configuration and operation of the direction conversion units 20 and 21 illustrated in FIG. 1. While FIG. 1 illustrates that the two direction conversion units 20 and 21 and the first and second cables 23 and 24 are disposed on the same plane of the base frame 22, both the direction conversion units 20 and 21 and the first and second cables 23 and 24 may be respectively arranged on two surfaces of the base frame 22 as illustrated in FIG. 2. For example, the first cable 23 and the first direction conversion unit 20 related to the second grippers 26 are illustrated in FIG. 2. In FIG. 2, the body 11 is not illustrated for convenience of illustration.

Referring to FIG. 2, the first cable 23 is wound around first and second pulleys 20a and 20b and a movement direction of the first cable 23 may be changed by using the first and second pulleys 20a and 20b. For example, the first cable 23 is respectively wound around the first pulley 20a and the second pulley 20b in opposite directions, and a terminal end of the first cable 23 may be coupled to a terminal end 26b of the second grippers 26 via the second pulley 20b. While the second grippers 26 is opened by the torsion spring 28, the terminal end 26b of the second grippers 26 and the second pulley 20b may be disposed at opposite ends to each other with respect to the center of the body 11, and the first cable 23 may be arranged in a direction perpendicular to the axial direction between the terminal end 26b of the second grippers 26 and the second pulley 26b. In this configuration, by pulling the first cable 23 in the axial direction, the first pulley 20a and the second pulley 20b rotate in opposite directions, and the first cable 23 moves to the right in FIG. 2 in the direction perpendicular to the axial direction between the terminal end 26b of the second grippers 26 and the second pulley 20b. Then, the grippers 26 are closed, and the terminal end 26b of the second grippers 26, which is on the side of an object, may contact the object. Meanwhile, the second cable 24 disposed on the opposite side of the base frame 22, illustrated in FIG. 2, may move to the left in FIG. 2 in the direction perpendicular to the axial direction, according to the above-described principle. Accordingly, no tension is generated to the first and second cables 23 and 24 in the axial direction, and tensions generated in the first and second cables 23 and 24 in the direction perpendicular to the axial direction are in opposite directions, and thus, may offset each other.

Figure 3:
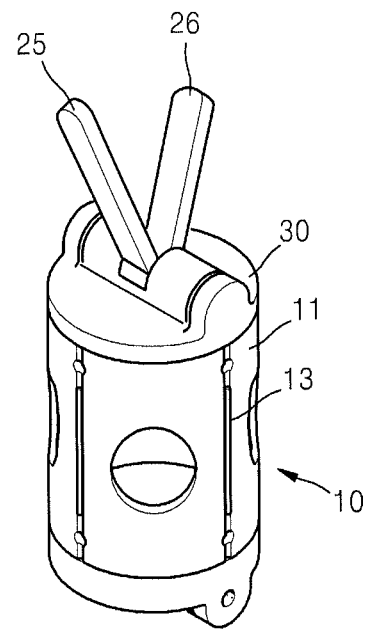
FIG. 3 is a schematic perspective of the robot arm illustrated in FIGS. 1 and 2, according to an example embodiment.

FIG. 3 is a schematic perspective view illustrating the robot arm 10 illustrated in FIGS. 1 and 2, according to an example embodiment. Referring to FIG. 3, for example, the robot arm 10 has the body 11 having a cylindrical form, and the cover 30 and the first and second grippers 25 and 26 may be installed at the operational end of the body 11. Components, such as, the first and second cables 23 and 24 and the first and second direction conversion units 20 and 21 may be installed in the body 11. Although not illustrated in the drawings, a lower portion of the robot arm 10 may be coupled to other joint portion of a robot. Further, a force sensing apparatus which includes a fiber Bragg grating (FBG) 13 and will be described later may be further installed at the body 11. The force sensing apparatus may measure, for example, a force acting between a surgical instrument picked up by the first and second grippers 25 and 26 and a living tissue, and may return a value of the measured force to an operator of a surgery robot.

Figure 4:
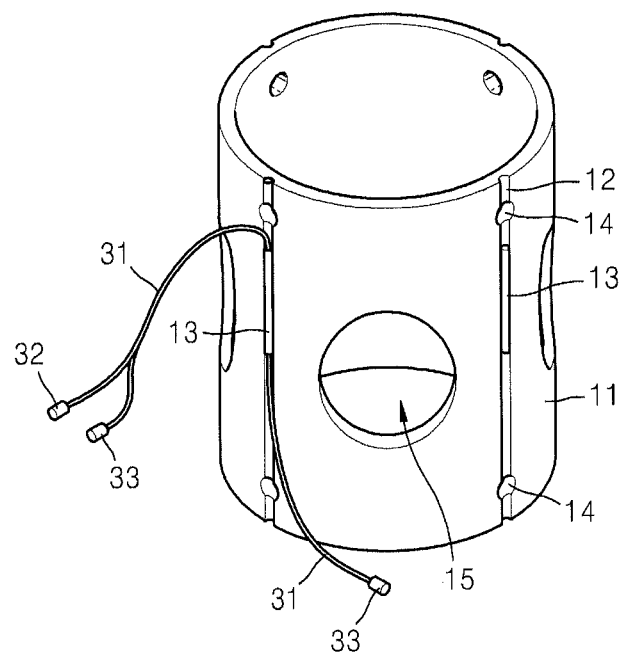
FIG. 4 is a schematic perspective view illustrating a force sensing apparatus included in the robot arm illustrated in FIG. 3, according to an example embodiment.

FIG. 4 is a schematic perspective view illustrating a force sensing apparatus included in the robot arm 10 illustrated in FIG. 3, according to an example embodiment. Referring to FIG. 4, the force sensing apparatus may comprise, for example, at least three FBGs 13 that are attached on a surface of the body 11 and extend in the axial direction of the body 11 (i.e., a z-axis direction), a light source 32 supplying light to each of the FBGs 13, and a light detector 33 that detects light reflected by each of the FBGs 13 or light that has passed through each of the FBGs 13. The FBGs 13 may be formed of thin optical fibers. Accordingly, to easily attach the FBGs 13 to the body 11, a groove 12 in which the FBGs 13 are safely mounted may be further formed in the surface of the body 11 in the axial direction. The fact that the FBGs 13 extend in the axial direction of the body 11 does not necessarily mean that the FBGs 13 are parallel to the axial direction of the body 11, but may indicate that an arrangement direction of the FBGs 13 contains an axial directional component of the body 11.

The body 11 may be formed of a material which is capable of sensitively generating elastic deformation in response to even a small force. For example, the body 11 may be formed of a plastic material having a large degree of elastic deformation, such as, polypropylene (PP). In addition, although the body 11 illustrated in FIG. 4 has a cylindrical shape, this is just an example, and is not limited thereto. For example, the body 11 may also have a polygonal cylinder shape. In addition, bolt holes 14 may be formed in upper and lower portions of the body 11 in order to fix the body 11 to other components of the robot arm 10.

Figure 5:
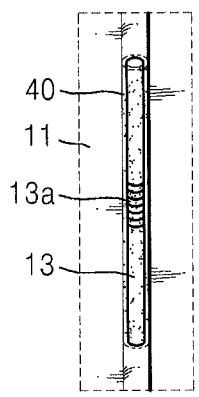
FIG. 5 is a schematic view illustrating a fiber Bragg grating (FBG) illustrated in FIG. 4, which is attached to a body of the force sensing apparatus of FIG. 4, according to an example embodiment.

The FBGs 13 may be attached to the body 11 by using an adhesive 40 (refer to FIG. 5). According to the embodiment of FIG. 4, when a force acts on the body 11, the entire body 11 may be elastically deformed. Accordingly, in order for the FBGs 13 to deform in the same way as the body 11, the body 11 may be coated with the adhesive 40, such that the FBGs 13 are covered by the adhesive 40 overall, as illustrated in FIG. 5.

In this configuration, the force sensing apparatus may measure degrees of tension and compression of the FBGs 13 to calculate an intensity and direction of forces acting upon the body 11. The FBGs 13 are formed by arranging a grating 13a (see FIG. 5) whose refractive index periodically changes inside an optical fiber. For example, the FBGs 13 may be formed by alternately and repeatedly arranging two different materials having different refractive indices in a core of an optical fiber. Due to the grating 13a, light of a predetermined wavelength among light that travels inside the FBGs 13 is reflected. A wavelength of the reflected light may vary according to an arrangement period of the grating 13a. When the FBGs 13 expand or shrink, the arrangement period of the grating 13a also expands or shrinks, and thus, the wavelength of reflected light also varies. Accordingly, by measuring the wavelength of light reflected by the grating 13a at an input end of the FBGs 13 or by measuring a wavelength of light that passes through the FBGs 13 at an output end of the FBGs 13, a degree by which the FBGs 13 expand or shrink may be accurately measured. In addition, when the FBGs 13 are attached along the axial direction of the body 11, the FBGs 13 also expand or shrink according to a degree of tension or compression of the body 11. Thus, by measuring light reflected by or light that passed through the FBGs 13, the degree of tension or compression of the body 11 may be accurately calculated.

The force sensing apparatus may further include a light transfer member 31 that transfers light emitted from the light source 32 to the FBG 13 and transfers light output from the FBG 13 to the light detector 33. The light transfer member 31 may be, for example, an optical fiber. The light source 32 and the light detector 33 may be not directly attached to the body 11, but may be connected to a computer (not shown) of a user or an exclusive calculation circuit (not shown) via the light transfer member 31. Although the light detector 33 is illustrated in FIG. 4 as being disposed both at the input end and the output end of the FBG 13, the light detector 33 may be also disposed only at one of the input end and the output end of the FBG 13.

To measure degrees of tension and compression of the body 11 in at least three directions, at least three FBGs 13 may be attached at at least three different positions on the surface of the body 11. In particular, in order to compensate for an error caused by temperature variation or the like, at least four FBGs 13 may be attached on the surface of the body 11. Although the light source 32 and the light detector 33 are illustrated as being connected only to the single FBG 13 in FIG. 4 for convenience of illustration, the current embodiment is not limited thereto. For example, the light source 32 and the light detector 33 may also be arranged at each of the plurality of FBGs 13. The plurality of FBGs 13 may be arranged at predetermined intervals in an azimuth angle direction. For example, when four FBGs 13 are used, the FBGs 13 may be arranged at intervals of 90 degrees along the azimuth angle direction.

Although the FBGs 13 are illustrated in FIG. 4 as being attached to an external surface of the body 11, the current embodiment is not limited thereto. The FBGs 13 may also be disposed on an inner surface of the body 11. In this case, the light transfer member 31, the light source 32, and the light detector 33 may also be arranged in an inner space of the body 11 with other components.

In order to increase the performance of the force sensing apparatus (for example, resolution, measurement range, or error rate), the body 11 may have a large elastic deformation ratio and a small sensitivity difference according to a direction in which a force acts upon the body 11. For example, it is better when a difference between a sensitivity with respect to a force acting in the axial direction (z-axis direction) and a sensitivity with respect to a force acting in a direction perpendicular to the axial direction (x-axis or y-axis direction) is smaller. If the difference between sensitivities is large in each direction, an error in calculating the force may increase. In consideration of the above point, as illustrated in FIG. 4, a plurality of openings 15 may be formed in the body 11 between each two adjacent FBGs 13. For example, assuming that a force acts upon an upper end of the body 11, the FBGs 13 may be arranged in a portion where the most deformation of the body 11 occurs, and the openings 15 may be formed in a portion where the least deformation of the body 11 occurs. As the openings 15 are formed, deformation occurring in other portions of the body 11 may be further increased. In addition, the openings 15 may be arranged, so as to minimize a difference between deformation in the axis direction (for example, sensitivity in a z-axis direction) and deformation (for example, sensitivity in the x-axis direction and the y-axis direction) in the direction perpendicular to the axis direction.

For example, the openings 15 may be arranged at an angle of 45 degrees from the bolt holes 14, respectively arranged in upper and lower portions of the body 11. That is, an extension line between a center of each of the bolt holes 14 and a center of each of the openings 15 may be inclined at 45 degrees from a horizontal plane. In this case, among spaces between two respectively adjacent openings 15, largest deformation may occur in an upper portion of the body 11, upon which a force works. Accordingly, the FBGs 13 may be arranged at upper portions of the body 11 between the two respective openings 15 where the largest deformation occurs. Further, to describe the position of the openings 15 with respect to each of the FBGs 13, the center of the openings 15 may be arranged at a position lower than a center of each of the FBGs 13 between each two adjacent FBGs 13. The lower position is defined by assuming the operational end of the force sensing apparatus as the upper end of the body 11. The openings 15 may be arranged in respective spaces between the FBGs 13. For example, when four FBGs 13 are used, four openings 15 may be formed in the body 11. Thus, it is possible to increase the sensitivity of the force sensing apparatus, and also a difference in sensitivities in each direction may be minimized at the same time.

Figure 6:
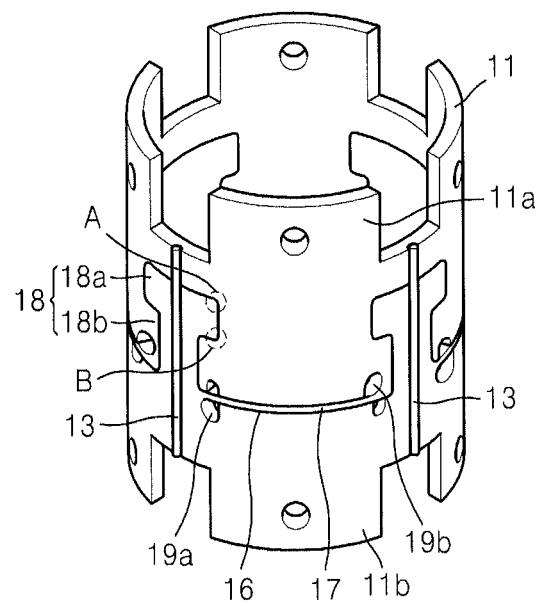
FIG. 6 is a schematic perspective view illustrating a force sensing apparatus, according to another example embodiment.

FIG. 6 is a schematic perspective view illustrating a structure of a force sensing apparatus, according to another example embodiment. According to the embodiment of FIG. 6, a plurality of thin elastic beams 17 that connect upper and lower portions of the body 11 are formed instead of the openings 15 in order to improve the elastic deformation of the body 11. Referring to FIG. 6, the body 11 is divided into an upper portion 11a and a lower portion 11b that are separated from each other by the thin elastic beams 17 formed in a direction perpendicular to an axial direction. The upper portion 11a and the lower portion 11b are connected to each other by using the elastic beams 17. Referring to FIG. 6, a right end of the elastic beam 17 is connected to the upper portion 11a, and a left end of the elastic beam 17 is connected to the lower portion 11b. However, this is just an example, and thus, the current embodiment is not limited thereto. For example, the right end of the elastic beam 17 may be connected to the lower portion 11b, and the left end of the elastic beam 17 may be connected to the upper portion 11a. Spaces between the elastic beam 17 and the lower portion 11b and between the elastic beam 17 and the upper portion 11a may be cut to form a gap 16 in each space. For example, the elastic beam 17, the upper portion 11a, and the lower portion 11b may be formed by partially cutting the single body 11 by using a wire electrical discharge machining (wire EDM) method.

Each of the elastic beams 17 may be arranged between each two adjacent FBGs 13. For example, if four FBGs 13 are used, four elastic beams 17 may be formed in the body 11. Accordingly, when a force acts upon the body 11, the gap 16 between the elastic beam 17 and the upper portion 11a and the gap 16 between the elastic beam 17 and the lower portion 11b may easily enlarge, and thus, an elastic deformation of the body 11 may further increase. According to the current embodiment, to prevent the elastic beams 17 from being easily damaged, the body 11 may be formed of a metal having a good rigidity such as titanium (Ti); however, the material forming the body is not limited thereto.

In addition, the force sensing apparatus illustrated in FIG. 6 may further include a stopper 18 formed between two adjacent elastic beams 17 to prevent an excessive deformation of the elastic beams 17. The stopper 18 may be formed of the upper portion 11a and the lower portion 11b of the body 11 that is divided by the gap 16. For example, the stopper 18 may be formed of a first protrusion 18a that protrudes and extended from the lower portion 11b toward the upper portion 11a in the axis direction and a second protrusion 18b that is protruded and extended from the upper portion 11a toward the lower portion 11b in the axis direction so as to surround the first protrusion 18a of the lower portion 11b. The first protrusion 18a of the lower portion 11b may have an intermediate portion having a relatively small width and an end portion having a relatively large width, and the second protrusion 18b of the upper portion 11a may also have an intermediate portion having a relatively small width and an end portion having a relatively large width. That is, the first protrusion 18a of the lower portion 11b and the second protrusion 18b of the upper portion 11a may be formed in a complementary engagement.

For example, the body 11 may be divided into the upper portion 11a and the lower portion 11b by using the gap 16 that is bent in the form of 'Ω' to form the second protrusion 18b and the first protrusion 18a in a complementary form. The first protrusion 18a and the second protrusion 18b are formed to be engaged with each other, thereby functioning as the stopper 18 that may prevent an excessive deformation of the elastic beams 17. For example, when the upper portion 11a of the body 11 is acted upon by a large force in a +z direction, the first protrusion 18a and the second protrusion 18b contact each other in a portion B marked in FIG. 6. Then, movement of the upper portion 11a in the +z direction is restricted. Additionally, when the upper portion 11a of the body 11 is acted upon by a large force in a −z direction, the first protrusion 18a and the second protrusion 18b contact each other in a portion A marked in FIG. 6. Then, movement of the upper portion 11a in the −z direction is restricted. Accordingly, even when a large force above the measurement range of the force sensing apparatus acts upon the body 11, the stopper 18 may prevent that the elastic beams 17 from being deformed outside a range in which they may be elastically restored.

The elastic beams 17 and the stoppers 18 may be formed in a monolithic manner by forming a plurality of gaps 16 in the single body 11 by using, for example, a wire EDM method. Each of the gaps 16 may have two side portions formed to be in a direction perpendicular to the axial direction and a center portion curved in the form of 'Ω' so as to form the stopper 18. Two adjacent gaps 16 are separated from each other in the axial direction and partially overlap each other in an azimuth angle direction. Moreover, the two side portions of the gap 16 extend in a direction perpendicular to the axial of the body 11 are arranged parallel to a side portion of another gap 16, and thus, the elastic beam 17 may be formed between the two parallel gaps 16. That is, the gap 16 may start between the lower portion 11b of the body 11 and the elastic beam 17 and pass through the stopper 18 to be extended up to a portion between the upper portion 11a of the body 11 and another elastic beam 17. For example, when four elastic beams 17 and four stoppers 18 are to be formed, four gaps 16 may be formed in the body 11. Further, in order to prevent the body 11 from wear due to fatigue caused repeated elastic deformations, openings 19a and 19b may be formed at two end portions of the gap 16, respectively.

Figure 7:
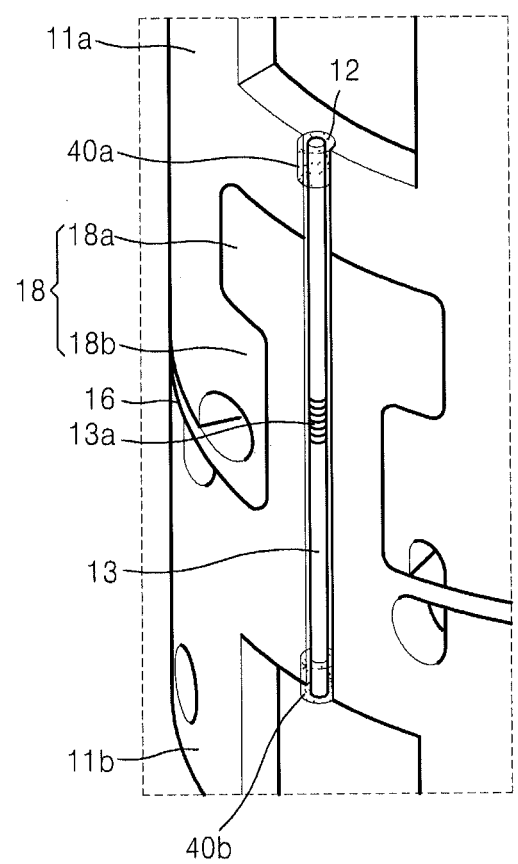
FIG. 7 is a schematic view illustrating a FBG illustrated in FIG. 6, which is attached to a body of the force sensing apparatus of FIG. 6.

Meanwhile, referring to FIG. 6, the FBGs 13 are attached to the body 11 across the stopper 18. However, this is just an example, and the FBGs 13 may also be attached to the body 11 across the elastic beams 17. In addition, as illustrated in FIG. 7, the FBGs 13 may be attached to the body 11 by using adhesives 40a and 40b. As in the embodiment of FIG. 6, when a force acts upon the body 11, the entire body 11 is not elastically deformed, but rather peripheral portions of the gaps 16 and the elastic beams 17 are mainly deformed. Accordingly, when the FBGs 13 are attached to the body 11 overall, an excessive tension is applied to the FBGs 13 in peripheral portions of the gaps 16 and the elastic beams 17 so that the FBGs 13 may be cut. Thus, as illustrated in FIG. 7, the adhesives 40a and 40b may be coated on the body 11 so as to cover only the two end portions of the FBGs 13. Further, the FBGs 13 may be attached to an inner surface of the body 11.

In addition, a tension of the cable for operating the instrument does not act in the axial direction of the robot arm, and thus, does not affect sensing of a force in the axial direction.

As described above, according to the one or more of the above embodiments, the robot arm 10 including the above-described force sensing apparatuses may accurately measure the intensity and direction of a force acting upon the operational end of the robot arm 10. Accordingly, the robot arm 10 according to the example embodiments may be used in medical surgery robots for performing, for example, surgical cautery.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A robot arm, comprising:
a body that is elastically deformable and has a pipe form extending in an axial direction;
an instrument pivotally connected to an operational end of the body via a hinge;
a cable that is connected to a proximal end of the instrument and is configured to control an operation of the instrument such that a tension in a direction perpendicular to the axial direction is offset;
a force sensing apparatus that is attached to a surface of the body and is configured to sense a force exerted upon the body; and
a direction conversion unit that is configured to convert a direction of the cable which is parallel to the axial direction to the direction perpendicular to the axial direction, the direction conversion unit disposed in the body,
wherein the force sensing apparatus includes,
at least three fiber Bragg gratings (FBGs) attached on the surface of the body,
a light source configured to provide light to each of the at least three FBGs;
a light detector configured to detect light reflected by each of the at least three FBGs or light passing through each of the at least three FBGs, and
at least one opening in the body and between two adjacent ones of the at least three FBGs,
wherein the at least one opening is disposed such that largest deformation occurs in an upper portion of the body where the instrument is installed and a center of the at least one opening is arranged at a position lower than a center of one of the at least three FBGs between the other two adjacent ones of the at least three FBGs, and
wherein the at least three FBGs are arranged at the upper portion of the body.

2. The robot arm of claim 1, wherein the cable at the proximal end of the instrument is configured to move along the direction perpendicular to an axial direction of the body.

3. The robot arm of claim 1, wherein the cable comprises a pair of cables configured to move at the proximal end of the instrument along the direction perpendicular to the axial direction of the body in opposite directions to each other.

4. The robot arm of claim 1, further comprising a cover covering the body at the operational end of the body,
wherein the instrument is pivotally installed to the cover.

5. The robot arm of claim 4, wherein the instrument comprises a pair of grippers, and
the cover comprises the hinge that pivots the pair of grippers and a torsion spring that is coupled to the hinge to provide an elastic force to the pair of grippers in a direction in which the pair of grippers split apart.

6. The robot arm of claim 1, further comprising:
a base frame arranged in the body,
wherein the direction conversion unit is installed on the base frame.

7. The robot arm of claim 6, wherein the cable comprises a pair of cables configured to move at the proximal end of the instrument along the direction perpendicular to the axial direction of the body in opposite directions to each other,
wherein the instrument comprises a pair of grippers respectively connected to the pair of cables,
wherein the pair of grippers comprises a first gripper and a second gripper, and the pair of cables comprises a first cable and a second cable, and the direction conversion unit comprises a first direction conversion unit and a second direction conversion unit,
wherein the first cable is engaged with the first direction conversion unit to be coupled to a proximal end of the second gripper, and the second cable is engaged with the second direction conversion unit to be coupled to a proximal end of the first gripper, and
wherein the first direction conversion unit is disposed opposite to the proximal end of the second gripper with respect to a center of the body, and the second direction conversion unit is disposed opposite to the proximal end of the first gripper with respect to the center of the body.

8. The robot arm of claim 7, wherein the first cable is arranged to move in a direction perpendicular to the axial direction of the body between the first direction conversion unit and the proximal end of the second gripper, and the second cable is arranged to move in the direction perpendicular to the axial direction of the body between the second direction conversion unit and the proximal end of the first gripper, and the first cable and the second cable are configured to simultaneously move in opposite directions.

9. The robot arm of claim 7, wherein each of the first and second direction conversion units comprises at least one pulley.

10. The robot arm of claim 9, wherein each of the first and second direction conversion units comprises two pulleys, and the first and second cables are wound around the two pulleys in opposite directions to each other.

11. The robot arm of claim [1], wherein the at least three FBGs are arranged to extend in the axial direction of the body.

12. The robot arm of claim [1], wherein the at least three FBGs are attached to the surface of the body at least three different positions at predetermined intervals along an azimuth angle direction.

13. The robot arm of claim [1], wherein the force sensing apparatus further comprises at least three openings that are formed in the body between each two adjacent FBGs.

14. The robot arm of claim 13, wherein the force sensing apparatus further comprises an adhesive to adhere the FBGs to the body, and the adhesive is coated on the body so as to cover the FBGs overall.

15. The robot arm of claim [1], wherein the body comprises: an upper portion and a lower portion separated from each other; at least three elastic beams that connect the upper portion and the lower portion of the body and extend in a direction perpendicular to an axial direction of the body; and a plurality of gaps respectively formed between each of the elastic beams and the upper portion of the body and between each of the elastic beams and the lower portion of the body.

16. The robot arm of claim 15, wherein a first end portion of each of the elastic beams is connected to the upper portion of the body, and a second end portion of each of the elastic beams disposed opposite the first end portion is connected to the lower portion of the body.

17. The robot arm of claim 15, wherein the body further includes at least three stoppers respectively formed in spaces between each two adjacent elastic beams.

18. The robot arm of claim 17, wherein the stopper comprises:
- a first protrusion that protrudes and extends from the lower portion of the body toward the upper portion of the body in the axial direction of the body; and
- a second protrusion that protrudes and extends from the upper portion of the body toward the lower portion of the body in the axis direction of the body to surround the first protrusion.

19. The robot arm of claim 18, wherein the first protrusion comprises an intermediate portion having a relatively small width and an end portion having a relatively large width, and the second protrusion comprises an intermediate portion having a relatively small width and an end portion having a relatively large width, wherein the first protrusion and the second protrusion are engaged with each other in a complementary form.

20. The robot arm of claim 17, wherein the FBGs are attached to the body across the stoppers.

21. The robot arm of claim 20, further comprising an adhesive to attach the FBGs to the body, wherein the adhesive is coated on the body to correspond only to two end portions of the FBGs.

22. The robot arm of claim 17, wherein the FBGs are attached to the body across the elastic beam.

23. The robot arm of claim 22, further comprising an adhesive to attach the FBGs to the body, wherein the adhesive is coated on the body to correspond only to two end portions of the FBGs.

24. A system, comprising:
- a robot arm, including a force sensing apparatus; and
- an instrument pivotally connected to the robot arm via a hinge;
- wherein the robot arm includes,
- a body that is elastically deformable and extends in an axial direction; and
- a cable that is connected to a proximal end of the instrument and is configured to control an operation of the instrument, such that a tension in a direction perpendicular to the axial direction is offset; and
- a direction conversion unit that is configured to convert a direction of the cable which is parallel to the axial direction to the direction perpendicular to the axial direction, the direction conversion unit disposed in the body,
- wherein the proximal end of the instrument which is connected to the cable is disposed between the direction conversion unit and the hinge,
- wherein the force sensing apparatus is attached to the body and is configured to sense a force exerted upon the body,
- wherein the force sensing apparatus includes,
- at least three fiber Bragg gratings (FBGs) attached on the surface of the body,
- a light source configured to provide light to each of the at least three FBGs;
- a light detector configured to detect light reflected by each of the at least three FBGs or light passing through each of the at least three FBGs, and
- at least one opening in the body and between two adjacent ones of the at least three FBGs,
- wherein the at least one opening is disposed such that largest deformation occurs in an upper portion of the body where the instrument is installed and a center of the at least one opening is arranged at a position lower than a center of one of the at least three FBGs between the other two adjacent ones of the at least three FBGs, and
- wherein the at least three FBGs are arranged at the upper portion of the body.

25. The robot arm of claim 1, wherein the cable controls the operation of the instrument such that the tension in the direction perpendicular to the axial direction and in the axial direction is eliminated; and
- the force sensing apparatus that is attached to the surface of the body and senses the force in the axial direction exerted upon the body regardless of a motion of the robot arm.

* * * * *